United States Patent
Kang (10) Patent No.: US 10,841,388 B2
(45) Date of Patent: Nov. 17, 2020

(54) METHOD OF PROVIDING REMOTE SERVICE TO VEHICLE AND SYSTEM THEREFOR

(71) Applicants: HYUNDAI MOTOR COMPANY, Seoul (KR); KIA MOTORS CORPORATION, Seoul (KR)

(72) Inventor: Seong Kue Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 175 days.

(21) Appl. No.: 16/000,115

(22) Filed: Jun. 5, 2018

(65) Prior Publication Data
US 2019/0215376 A1 Jul. 11, 2019

(30) Foreign Application Priority Data
Jan. 8, 2018 (KR) .......... 10-2018-0002339

(51) Int. Cl.
| | |
|---|---|
| H04L 29/08 | (2006.01) |
| H04W 4/80 | (2018.01) |
| H04L 29/12 | (2006.01) |
| H04W 28/04 | (2009.01) |
| H04W 4/50 | (2018.01) |
| H04W 88/04 | (2009.01) |

(52) U.S. Cl.
CPC .......... *H04L 67/26* (2013.01); *H04L 61/6022* (2013.01); *H04W 4/50* (2018.02); *H04W 4/80* (2018.02); *H04W 28/04* (2013.01); *H04L 61/103* (2013.01); *H04L 67/12* (2013.01); *H04W 88/04* (2013.01)

(58) Field of Classification Search
CPC .......... H04W 4/80; H04L 67/12; H04L 67/26
See application file for complete search history.

(56) References Cited

U.S. PATENT DOCUMENTS

| | | | |
|---|---|---|---|
| 9,326,092 B2 | 4/2016 | Nelson et al. | |
| 10,286,798 B1* | 5/2019 | Penilla | H01M 10/425 |
| 2005/0159823 A1* | 7/2005 | Hayes | G08C 19/28 |
| | | | 700/19 |
| 2006/0206610 A1 | 9/2006 | Ling et al. | |
| 2014/0047065 A1* | 2/2014 | Kim | H04L 67/26 |
| | | | 709/217 |

(Continued)

FOREIGN PATENT DOCUMENTS

| | | |
|---|---|---|
| KR | 10-1373175 B1 | 3/2014 |
| KR | 10-2016-0017545 A | 2/2016 |

(Continued)

*Primary Examiner* — Jeong S Park
(74) *Attorney, Agent, or Firm* — Morgan, Lewis & Bockius LLP (57) ABSTRACT

A method of providing a remote service includes performing linkage setting for setting a center server, a controller included in a vehicle, a mobile device, and a push server to transmit and receive information to and from each other, requesting, by the center server, that the push server transmit notification information using a push scheme, transmitting, by the push server, the notification information received from the center server to the mobile device using the push scheme, and forwarding, by the mobile device, the notification information received from the push server to the controller.

22 Claims, 6 Drawing Sheets

(56) References Cited

U.S. PATENT DOCUMENTS

| | | | |
|---|---|---|---|
| 2015/0381820 A1* | 12/2015 | Ting | H04W 4/14 |
| | | | 370/259 |
| 2016/0227009 A1* | 8/2016 | Kim | B60K 35/00 |
| 2016/0359977 A1* | 12/2016 | Goebl | H04L 67/10 |
| 2017/0287237 A1* | 10/2017 | Koenig | G07C 5/008 |
| 2017/0294059 A1* | 10/2017 | Noyelle | G07C 5/0808 |

FOREIGN PATENT DOCUMENTS

| KR | 10-2017-0105652 A | 9/2017 |
|---|---|---|
| WO | 2015/183779 A1 | 12/2015 |

* cited by examiner

METHOD OF PROVIDING REMOTE SERVICE TO VEHICLE AND SYSTEM THEREFOR

CROSS-REFERENCE TO RELATED APPLICATION

This application claims the benefit of Korean Patent Application No. 10-2018-0002339, filed on Jan. 8, 2018, which is hereby incorporated by reference as if fully set forth herein

TECHNICAL FIELD

The present disclosure relates to a method of providing a remote service to a vehicle and a system therefor.

BACKGROUND

A vehicle is, in general, equipped with an audio/video/navigation/telematics (AVNT) system to provide convenience to passengers of the vehicle. The AVNT system is operated by receiving necessary information from a server which is remotely connected to the vehicle.

Generally, a connection scheme between the AVNT system and the remote server includes a polling scheme in which the AVNT system periodically requests information and the AVNT system and the remote server are connected only when the AVNT system requests that the remote server transmit information, a push scheme in which the remote server informs the AVNT system of occurrence of information update when information to be updated occurs while the AVNT system and the remote server continue to maintain a connected state, and a short message service (SMS) scheme in which the remote server transmits information to the AVNT system using infrastructure of a communication company.

The polling scheme is lower in fixed cost than the push scheme and service provision cost in the polling scheme is proportional to the number of information requests (a reciprocal of an information request period). Accordingly, cost increases in order to rapidly transmit information. Even when information update does not occur, since an information request is periodically made, unnecessary traffic occurs and traffic is also proportional to the number of information requests. The push scheme is high in fixed cost because connection between the AVNT system and the remote server should be maintained. However, service provision cost is almost constant, information can be rapidly transmitted, and unnecessary traffic does not occur. That is, the push scheme has advantages and disadvantages contrary to those of the polling scheme.

The SMS scheme may be similar to the push scheme in terms of rapid information transmission and non-occurrence of unnecessary traffic. However, the SMS scheme is high in cost per information transmission although fixed cost is not needed.

Since the above-described connection schemes have respective advantages and disadvantages, a service provider uses only the push scheme or adopts a combination of the SMS scheme and the polling scheme in consideration of cost and service requirements. If a request for information transmission performed with respect to the server increases to a predetermined level or more, it is better to use only the push scheme in consideration of fixed cost.

A passenger of a vehicle generally carries a mobile device having a service function of providing information by the push scheme. In this case, the passenger of the vehicle suffers from double burden of cost for a service provided when the AVNT system of the vehicle is directly connected to the remote server and cost for a remote service received by the mobile device.

SUMMARY

Exemplary embodiments of the present disclosure provide a method of providing a remote service to a vehicle, which is favorable in terms of both cost and rapid service provision, and a system therefor.

It will be appreciated by persons skilled in the art that the objects that could be achieved with embodiments are not limited to what has been particularly described hereinabove and other objects that are not mentioned herein will be more clearly understood from the following detailed description.

To achieve these objects and other advantages and in accordance with the purpose of the invention, as embodied and broadly described herein, a method of providing a remote service includes performing linkage setting for setting a center server, a controller included in a vehicle, a mobile device, and a push server to transmit and receive information to and from each other, requesting, by the center server, that the push server transmit notification information using a push scheme, transmitting, by the push server, the notification information received from the center server to the mobile device using the push scheme, and forwarding, by the mobile device, the notification information received from the push server to the controller.

In another aspect of the present disclosure, a system for providing a remote service includes a center server, a controller configured to transmit and receive information to and from the center server and mounted in a vehicle, a mobile device configured to transmit and receive information to and from the center server and the controller, and a push server configured to transmit and receive information to and from the center server and the mobile device, wherein the controller periodically transmits and receives information to and from the center server using a polling scheme, and if the mobile device and the controller are coupled by a short-range communication, the controller stops a periodic polling request performed with respect to the center server.

DETAILED DESCRIPTION

Reference will now be made in detail to embodiments, examples of which are illustrated in the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments.

While terms, such as "first", "second", etc., may be used to describe various components, such components must not be limited by the above terms. The above terms are used only to distinguish one component from another. In addition, terms particularly defined in consideration of construction and operation of the embodiments are used only to describe the embodiments and do not define the scope of the embodiments.

In the description of the embodiments, it will be understood that, when an element is referred to as being formed "on" or "under" another element, it can be directly "on" or "under" the other element or be indirectly formed with intervening elements therebetween. It will also be understood that, when an element is referred to as being "on" or "under," "under the element" as well as "on the element" can be included based on the element.

As used herein, relational terms, such as "on"/"upper part"/"above", "under"/"lower part"/"below," and the like, are used solely to distinguish one entity or element from another entity or element without necessarily requiring or implying any physical or logical relationship or order between such entities or elements.

Figure 1:
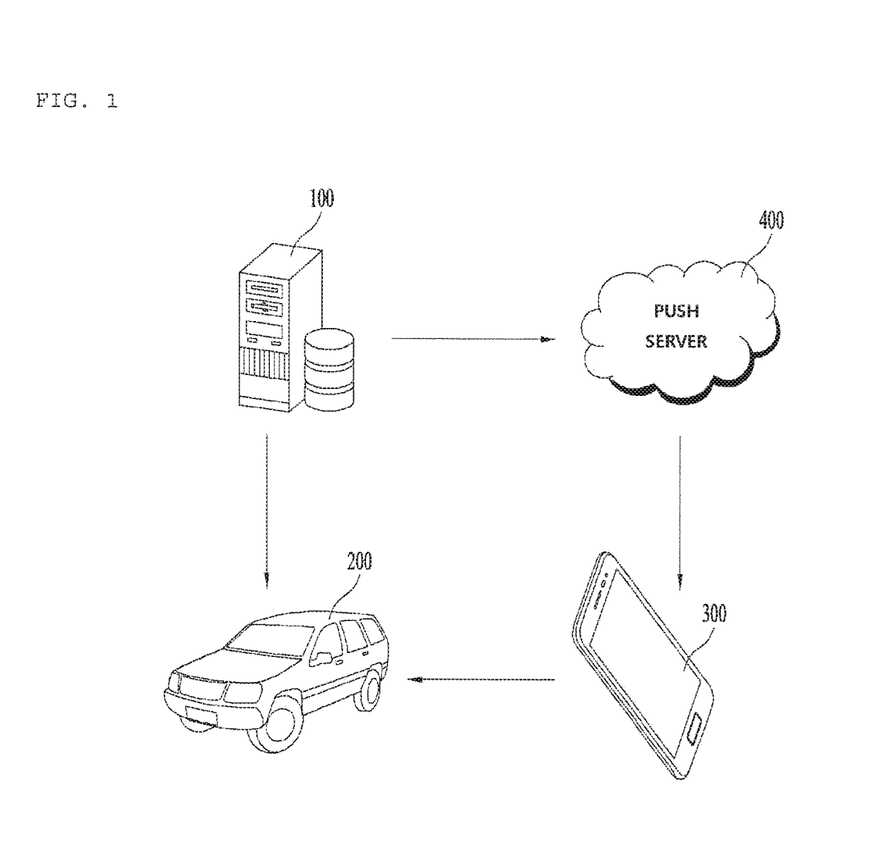
FIG. 1 is a diagram illustrating a remote service provision system of an embodiment of the present disclosure.

FIG. 1 is a diagram illustrating a remote service provision system of an embodiment of the present disclosure.

The remote service provision system may include a center server 100, a controller 200, a device 300, and a push server 400.

The center server 100 may provide information needed by a vehicle while the vehicle travels. The controller 200 may be mounted in the vehicle and may transmit and receive information to and from the center server 100. The controller 200 may operate and control an AVNT system integrating elements mounted in the vehicle in order to provide convenience to passengers of the vehicle. In addition, the controller 200 may monitor states of other controllers through a network within the vehicle and transmit commands to the controllers.

The controller 200 may periodically transmit and receive information to and from the center server 100 using a polling scheme. In FIG. 1, an arrow denoted from the center server 100 to the controller 200 represents that the center server 100 transmits information to the controller 200 using the polling scheme.

The controller 200 and the center server 100 may periodically exchange information using the polling scheme. That is, the controller 200 may periodically request that the center server 100 transmit information for operating and controlling the AVNT system. Then, the center server 100 may transmit the requested information to the controller 200.

The device 300 may be a mobile device capable of performing wireless communication. For example, the device 300 may be a smartphone, a tablet PC, or the like. Since the device 300 maintains connection to the push server 400, the device 300 may receive notification information from the push server 400 in real time.

The device 300 may transmit and receive information to and from the center server 100 and the controller 200. The device 300 is coupled to the controller 200 by a short-range communication means and may transmit and receive information to and from the controller 200. The short-range communication means may be Bluetooth, Wi-Fi, or near-field communication (NFC).

If the device 300 is coupled to the controller 200 by the short-range communication means, the center server 100 may transmit information for operating and controlling the AVNT system to the controller 200 via a detour path passing through the push server 400 and the device 300, as illustrated by arrows in FIG. 1.

Information transmission through such a detour path may be performed by a push scheme after the device 300 and the controller 200 are coupled. That is, the center server 100 is continuously connected to the controller 200 through the detour path, and if it is necessary to transmit notification information, the center server 100 may transmit the notification information to the controller 200 through the detour path.

Since information transmission of the push scheme through the detour path is performed in a state in which the center server 100 and the controller 200 is continuously connected so as to perform communication, it is unnecessary for the controller 200 to request that the center server 100 transmit information, as opposed to information transmission using the polling scheme. If it is determined that the center server 100 needs to transmit the notification information to the controller 200, the center server 100 may transmit the notification information to the controller 200 even without the request of the controller 200.

In an embodiment, when the device 300 is disposed in the vehicle, the controller 200 may receive the notification information by two paths and schemes, i.e., the polling scheme through a direct path connected to the center server 100 and the push scheme through a detour path using the device 300.

When such two paths are simultaneously used, a user riding in the vehicle may be burdened with double communication cost. In terms of an operator of the center server 100, when an information provision service of the polling scheme is performed, if there is an excessively large number of controllers 200 of vehicles simultaneously connected to the center server 100, a communication obstacle may occur and the number of communication channels in the center server 100 should be increased.

Accordingly, in an embodiment, the center server 100 can solve the above problems by providing the notification information to the controller 200 through the push server 400 operated by a third party.

That is, since the device 300 has generally received an information reception service through the push server 400 operated by a third party, if the controller 200 of the vehicle receives the notification information from the center server 100 using such a push service, the user can reduce the burden of double communication cost and the operator of the center server 100 can easily solve occurrence of a communication obstacle and reduce the burden of expanding the number of communication channels of the center service 100.

The push server 400 may transmit and receive information to and from the center server 100 and the mobile device 300. The push server 400 may be operated by a third party other than the operator of the center server 100.

The push server 400 may generally serve to provide necessary information to the device 300. If connection between the push server 400 and the device 300 is completed, the push server 400 continues to be connected to the device 300 and may provide necessary information to the device 300.

In an embodiment, if the center server 100, the push server 400, the device 300, and the controller 200 are connected, the push server 400 may serve as a relay for receiving, from the center server 100, the notification information that the center server 100 provides to the controller 200 and transmitting the notification information again to the device 300.

In an embodiment, if the device 300 and the controller 200 are coupled by a short-range communication means, the center server 100, the push server 400, the device 300, and the controller 200 are connected and the controller 200 may receive the notification information from the center server 100 through a detour path via the push server 400 and the device 300, even without requesting that the center server 100 transmit the information.

Figure 2:
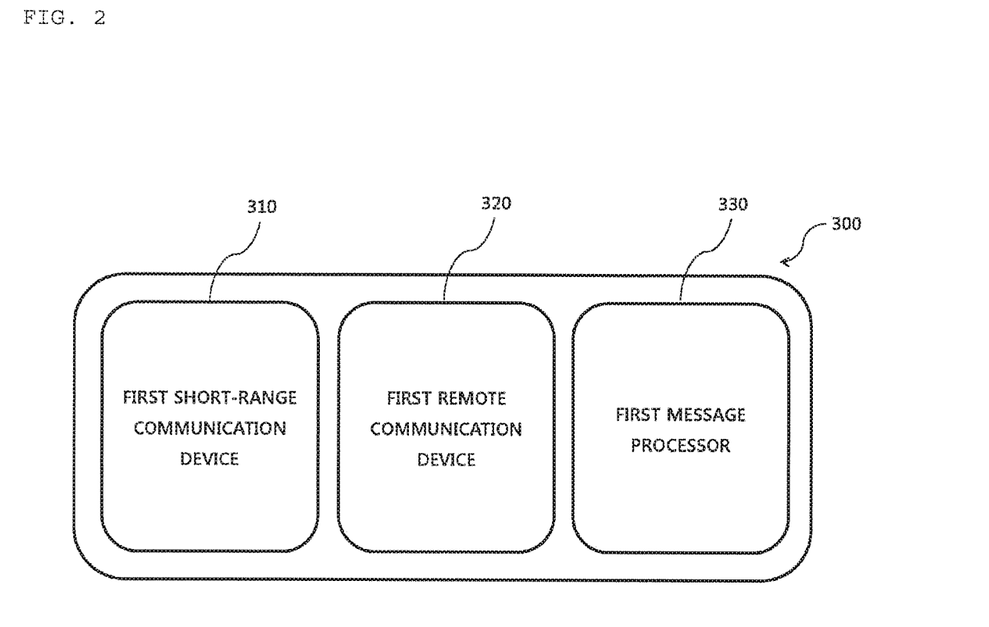
FIG. 2 is a diagram illustrating a mobile device of an embodiment of the present disclosure.

FIG. 2 is a diagram illustrating the device 300 of an embodiment. The device 300 may include a first short-range communication device 310, a first remote communication device 320, and a first message processor 330.

The first short-range communication device 310 may communicate with the controller 200 by a short-range communication means, and therefore, transmit notification information transmitted through a detour path by the center server 100 to the controller 200.

The first remote communication device 320 may communicate with the center server 100 and the push server 400, perform linkage setting (S100), which will be described later, by communicating with the center server 100, and receive, from the push server 400, the notification information transmitted through the detour path by the center server 100.

The first message processor 330 may process a message transmitted by the push server 400. The center server 100 may transmit the notification information to the push server 400 in the form of a message and the push server 400 may again transmit the message to the device 300.

Upon receiving the message, the device 300 may determine whether to transmit the message to the controller 200 through the first message processor 330. When necessary, the device 300 may edit the message which is to be transmitted to the controller 200 or display the message thereon so that a user may view the message.

In the various embodiments, the first short-range communication device 310, the first remote communication device 320, and the first message processor 330 are hardware devices embedded in the device 300 which can be implemented using one or more processors coupled to a memory (or other non-transitory machine readable recording medium) storing computer-executable instructions for causing the processor(s) to perform the functions of the first short-range communication device 310, the first remote communication device 320, and the first message processor 330.

In addition, the first short-range communication device 310 and the first remote communication device 320 may transmit an analog or digital signal over wire or wirelessly and may include one or more components that enable communication with an external device. Examples of the first short-range communication device 310 and the first remote communication device 320 include Bluetooth devices, infrared devices, modem, network card (using Ethernet), smartphone, Wi-Fi devices (using a Wi-Fi router), etc.

Figure 3:
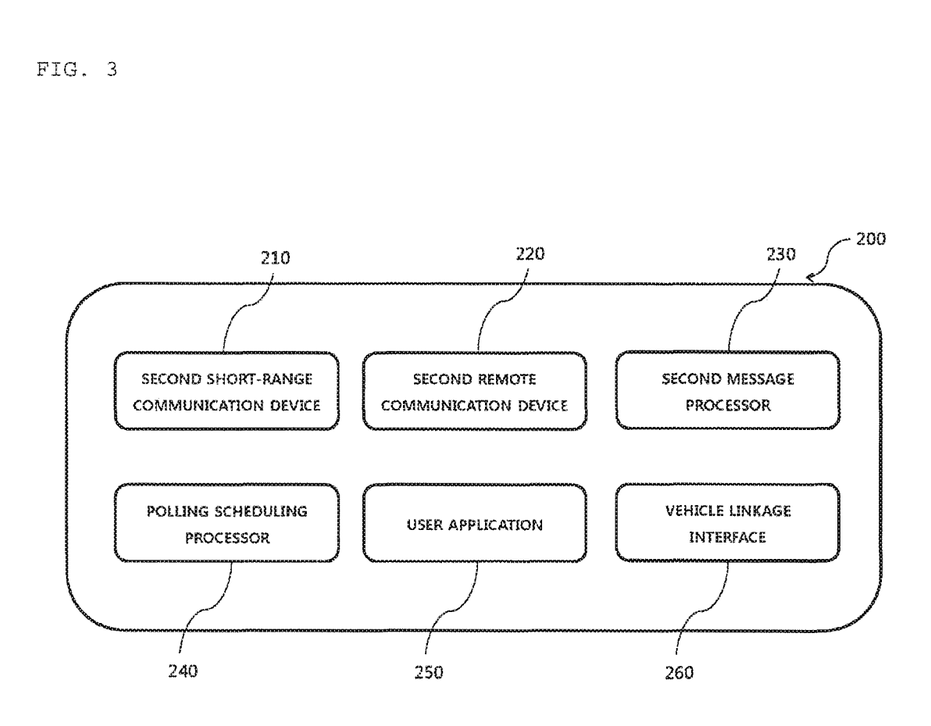
FIG. 3 is a diagram illustrating a controller of an embodiment of the present disclosure.

FIG. 3 is a diagram illustrating the controller 200 of an embodiment. The controller 200 may include a second short-range communication device 210, a second remote communication device 220, a second message processor 230, a polling scheduling processor 240, a user application 250, and a vehicle linkage interface 260.

The second short-range communication device 210 may communicate with the device 300 by a short-range communication means, and therefore, the controller 200 may receive notification information transmitted by the center server 100 to the device 300 through a detour path.

The second remote communication device 220 may communicate with the center server 100. If the controller 200 is not connected to the center server 100 through a detour path via the device 300, the controller 200 may be directly connected to the center server through the second remote communication device 220 and receive the notification information from the center server 100.

The second message processor 230 may process a message transmitted by the center server 100 or the device 300. The controller 200 may be directly connected to the center server 100 to receive the notification information of a message type from the center server 100 by a polling scheme and may be connected through a detour path via the device 300 to receive the notification information of the message type from the center server 100 by a push scheme.

Accordingly, the second message processor 230 may control an AVNT system based on the message transmitted by the center server 100 or the device 300. When necessary, the second message processor 230 may edit the message or display the message on the controller so that a user may view the message.

The polling scheduling processor 240 may manage information transmission and reception of the polling scheme between the controller 200 and the center server 100. The polling scheduling processor 240 may set a time period for requesting that the center server 100 transmit necessary information.

The user application 250 is used by a passenger of the vehicle who is a user. The user may obtain necessary information, for example, navigation information and music information, from the AVNT system through the user application 250. When necessary, the user may control the AVNT system using the user application 250.

The vehicle linkage interface 260 may connect elements included in the vehicle, for example, peripheral devices such as an amplifier, and other controllers within the vehicle so that they are linked with the controller 200. Accordingly, the controller 200 may transmit a command signal to, for example, the controllers within the vehicle, through the vehicle linkage interface 260.

Here, the controller 200 can be implemented using one or more processors coupled to a memory (or other non-transitory machine readable recording medium) storing computer-executable instructions for causing the processor(s) to perform the functions described above including the functions described in relation to the second short-range communication device 210, the second remote communication device 220, the second message processor 230, the polling scheduling processor 240, the user application 250, and the vehicle linkage interface 260.

In addition, the second short-range communication device 210 and the second remote communication device 220 may transmit an analog or digital signal over wire or wirelessly and may include one or more components that enable communication with an external device. Examples of the second short-range communication device 210 and the second remote communication device 220 include Bluetooth devices, infrared devices, modem, network card (using Ethernet), smartphone, Wi-Fi devices (using a Wi-Fi router), etc.

Further, the controller 200 may be an electronic control unit (ECU) capable of controlling various subsystems including the second short-range communication device 210, the second remote communication device 220, the second message processor 230, the polling scheduling processor 240, the user application 250, and the vehicle linkage interface 260, which are embedded therein or connected thereto.

Figure 4:
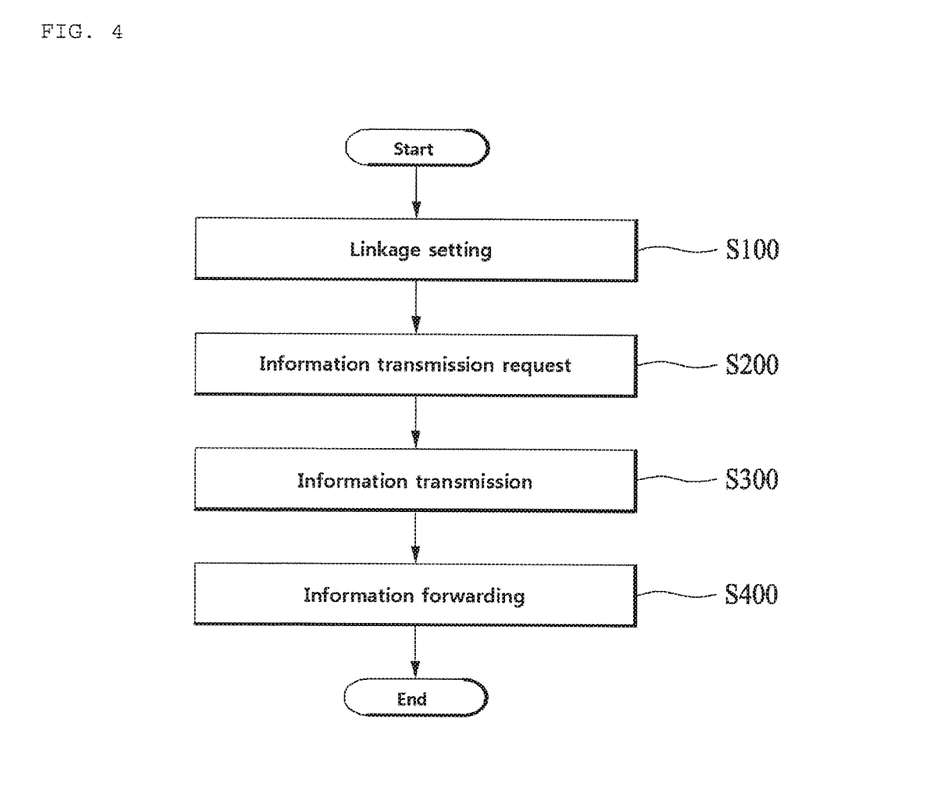
FIG. 4 is a flowchart illustrating a remote service provision method of an embodiment of the present disclosure.

FIG. 4 is a flowchart illustrating a remote service provision method of an embodiment. All of or a part of the steps method and/or operations of the foregoing embodiments can be realized using computer hardware and computer programs executed thereon.

The remote service provision method may include performing linkage setting (S100), performing information transmission request (S200), performing information transmission (S300), and performing information forwarding (S400).

The remote service provision method may further include performing path selection. An operation of path selection will be described first. The operation of path selection may be simultaneously with an operation of information forwarding (S400) even while the operation of information forwarding (S400) is performed.

In performing path selection (S400), the center server 100 may select a path through which information is to be transmitted to the controller 200. That is, the center server 100 may select a path through which the center server 100 directly transmits notification information to the controller 200 or a path through which the center server 100 transmits the notification information to the controller 200 via the push server 400 and the device 300.

Even when the center server 100 can transmit the information to the controller 200 through a detour path via the push server 400, the center server 100 may directly transmit the information to the controller 200 even without the request of the controller 200 without passing through such a detour path.

The center server 100 may determine whether to directly transmit the information or to transmit the information through a detour path to the controller 200, in consideration of the property of the information, a transmission rate, sufficiency/insufficiency of transmission channels of the center server 100, and cost consumed to transmit the information.

If emergency information needs to be transmitted to the controller 200 and direct transmission to the controller 200 is faster than detour path transmission, the center server 100 may select direction transmission rather than detour path transmission. If there are more than one controllers 200 directly connected to the center server 100 so that transmission channels of the center server 100 are sufficient, if direct transmission consumes less cost than detour path transmission, or if detour path transmission is impossible, the center server 100 may transmit the information to the controller 200 through a direct path rather than a detour path.

In performing linkage setting (S100), the center server 100, the controller 200 mounted in the vehicle, the mobile device 300, and the push server 400 may be set to transmit and receive information to and from each other.

The controller 200 may periodically transmit and receive information to and from the center server 100 at an early stage by a polling scheme. If an operation of linkage setting (8100) is ended and then the device 300 and the controller 200 are coupled by a short-range communication means, the controller 200 may stop performing the periodic polling scheme with the center server 100.

Specifically, the operation of linkage setting (S100) may be completed through the following processes.

First, the device 300 may be registered in the push server 400. If device 300 requests that the push server 400 perform registration, the push server 400 may permit the requested device 300 to be registered in the push server 400.

Next, after the device 300 is registered in the push server 400, the device 300 may receive a token of the device 300 issued by the push server 400.

Next, the device 300 may register information about the device 300, the token of the device 300, and account information about the center server 100 in the center server 100. The account information may be, for example, an ID of a user for receiving a service from the center server 100.

The information about the device 300 includes a media access control (MAC) address of the device 300.

Next, the controller 200 and the device 300 may be coupled by the short-range communication means so that the controller 200 and the device 300 may communicate with each other.

Thereafter, the controller 200 may transmit the information about the device 300 and the vehicle information included in the controller 200 to the center server 100. Vehicle information may include a vehicle identification number (VIN) of the vehicle and a MAC address of the controller 200 mounted in the vehicle.

If the MAC addresses of the device 300 received from the device 300 and the controller 200 match, the center server 100 may register the VIN, the account information, the MAC address of the controller 200, and the MAC address of the device 300.

If the operation of linkage setting (S100) is ended, the center server 100 may transmit notification information to the controller 200 through a detour path via the push server 400. When the operation of linkage setting (S100) is ended, the center server 100 may have Table 1 and Table 2 shown below.

TABLE 1

| VIN | Account information | Activation/ deactivation of controller 200 | MAC address of controller 200 | MAC address of device 300 |
|---|---|---|---|---|
| 1 | ... | ... | ... | ... |
| . | ... | ... | ... | ... |
| N | ... | ... | ... | ... |

TABLE 2

| | MAC address of device 300 | Token of device 300 |
|---|---|---|
| 1 | ... | ... |
| . | ... | ... |
| N | ... | ... |

As shown, Table 1 may include a VIN, account information, information about activation/deactivation of the controller 200, a MAC address of the controller 200, and a MAC address of the device 300 and Table 2 may include a MAC address of the device 300 and a token of the device 300 corresponding to the MAC address of the device 300.

Since the center server 100 may be connected to a plurality of controllers 200, information for providing plural (N) services may be recorded in Table 1 and Table 2.

If the device 300 is a smartphone, telephone numbers may be recorded in Table 1 and Table 2 as additional information about the device 300. The telephone numbers of the device 300 may be recorded in Table 1 and Table 2 through a process similar to the above process for the MAC address of the device 300.

Figure 5:
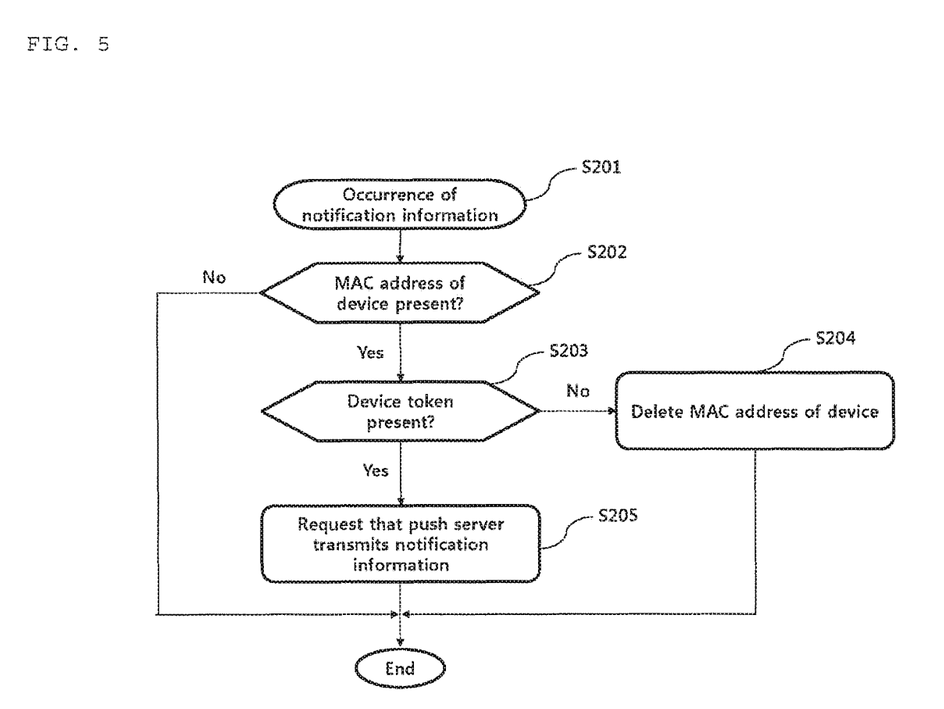
FIG. 5 is a flowchart illustrating information transmission request of an embodiment of the present disclosure.

FIG. 5 is a flowchart illustrating information transmission request (S200) of an embodiment. If the operation of linkage setting (S100) is ended, the center server 100 may perform information transmission request (S200). When the controller 200 of the vehicle is in an activation state, the center server 100 may perform information transmission request (S200). Herein, the activation state refers to the state in which the controller 200 is connected to the device 300 through short-range communication.

When the controller 200 is deactivated, the center server 100 is prevented from continuing to transmit notification information to the device 300 because the controller 200 cannot receive the information from the center server 100.

Therefore, it is first checked whether the center server 100 and the controller 200 are activated and it is proper to perform information transmission request (S200) only when the controller 200 is activated.

In performing information transmission request (S200), the center server 100 may request that the push server 400 to transmit notification information by a push scheme. Specifically, information transmission request (S200) may be ended through the following processes. Each process described below may be performed by the center server 100.

Upon occurrence of the notification information which is to be transmitted to a specific vehicle from the center server 100 (S201), it may be determined whether a MAC address of the device 300 linked with the controller 200 of the corresponding vehicle is present in the center server 100 (S202). If the MAC address of the device 300 is present, the next process is performed, and if not, information transmission request S200 is ended.

Next, the center server 100 may determine whether a token of the device 300 corresponding to the MAC address of the device 300 is present (S203). If the token of the device 300 is present, the following process may be preformed.

If the token of the device 300 corresponding to the MAC address of the device 300 is not present, the center server 100 may delete the MAC address of the device 300 of Table 1 and completes information transmission request S200 (S204).

If the token of the device 300 is not present, since the push server 400 cannot be used, the center server 100 deletes information about the device 300 which cannot transmit notification information through the push server 400.

Next, the center server 100 may transmit the notification information to the push server 400 and request that the push server 400 transmit the notification information to the device 300 corresponding to the token of the device 300 (S205).

In this case, the center server 100 may transmit the notification information to the push server 400 in the form of a message. The message may be composed in various forms and include various contents. Contents transmitted to a vehicle and a user through the message may be as follows.

If a traffic situation such as traffic amount of a road is changed, information about the traffic situation and a command of researching a traveling path may be transmitted to a navigation system of the vehicle. Information about parking of the vehicle, i.e., information about a current situation of a parking lot, may be transmitted to the user through the controller 200.

The message may include notifications such as a campaign for vehicle recall and update of vehicle software. Information about a result of remote diagnosis of the vehicle may be transmitted to the user and an additional command according to the result of remote diagnosis may be transmitted to the user.

Information about a channel-based or time-based radio program schedule may be provided to the controller 200 so that the controller 200 may properly control an AVNT system. The user may designate a radio program through a bookmark based on the provided information and the controller 200 may cause the radio to be automatically tuned to a desired channel according to the provided information.

The message may be transmitted to the user through a detour path via the push server 400 in the format of notification text so that service cost can be reduced relative to the case in which the notification information is directly transmitted to the controller 200 by the center server 100.

The center server 100 may transmit the message to the push server 400 by indicating whether the message is to be transmitted to the controller 200. The message transmitted by the center server 100 may be transmitted to the device 300 or may be transmitted to the controller 200 via the device 300.

Accordingly, the center server 100 may transmit the message to the push server 400 by indicating whether the message is to be transmitted to the controller 200. If the message transmitted to the push server 400 is to be transmitted to the controller 200, the message may be transmitted to the controller 200, and if not, the message may be transmitted only to the device 300.

In performing information transmission (S300), the push server 400 may transmit the notification information received from the center server 100 to the device 300 by a push scheme. For example, the push server 400 may retransmit the message received from the center server 100 to the device 300 corresponding to the token of the device 300 included in the push server 400.

If the message is not transmitted to the device 300, the push server 400 may indicate message transmission failure to the center server 100. If message transmission failure is indicated by the push server 400, the center server 100 may directly transmit the message to the controller 200 or take any other measures.

Figure 6:
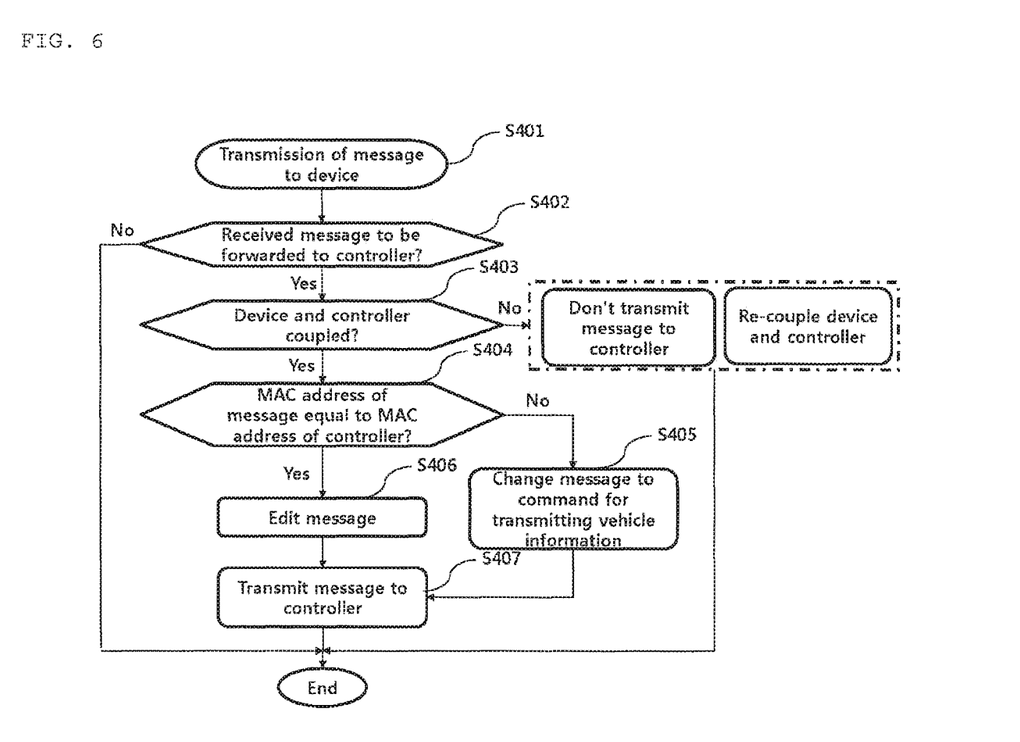
FIG. 6 is a flowchart of information forwarding of an embodiment of the present disclosure.

FIG. 6 is a flowchart of information forwarding (S400) of an embodiment. In information forwarding (S400), the device 300 may forward the notification information received from the push server 400 to the controller 200.

In this case, the notification information may be a message format. Specifically, information forwarding (S400) may be ended through the following processes. Each process may be performed by the device 300.

If the message is transmitted by the push server 400 to the device 300 (S401), it is determined whether the received message is to be forwarded to the controller 200 and this may be performed by the first message processor 330 (S402).

If the message is not intended to be forwarded to the controller 200, the message is not forwarded to the controller 200 and information forwarding S400 is ended. If the message is intended to be forwarded to the controller 200, the following processes may be performed.

The device 300 may determine whether the device 300 and the controller 200 are coupled by a short-range communication means (S403).

If the device 300 and the controller 200 are not coupled by the short-range communication means, the device 300 may not transmit the message to the controller 200 and may end information forwarding (S400).

As another embodiment, if the device 300 and the controller 200 are not coupled by the short-range communication means, the device 300 may be coupled again with the controller 200 by the short-range communication means. If the device 300 and the controller 200 are coupled, the following processes may be performed.

One of the processes of ending information forwarding without transmitting the message to the controller 200 and the process of re-coupling the device 300 and the controller 200 by the short-range communication means may be selectively performed.

If the device 300 and the controller 200 are coupled, the device 300 may determine whether a MAC address of the controller 200 recorded in the message is equal to a MAC address of the controller 200 coupled by the short-range communication means (S404).

If the MAC address of the controller 200 recorded in message is not equal to the MAC address of the controller 200 coupled by the short-range communication means, the device 300 may change the message to a command causing the controller 200 to transmit information about the device 300 and vehicle information included in the controller 200 to the center server 100 (S405).

If the contents of the message changed by the device 300 are transmitted to the controller 200, the controller 200 may perform the received command. That is, the controller 200 may transmit the information about the device 300 and the vehicle information to the center server 100 and change linkage setting between the center server 100, the controller 200, the device 300, and the push server 400 so as to correct inequality of the MAC addresses of the controller 200. Such change in linkage setting may be performed by resuming linkage setting (S100) described above.

If the MAC address of the controller 200 recorded in the message is equal to the MAC address of the controller 200 which is coupled by the short-range communication means, the device 300 may edit the message (S406).

The device 300 may edit the message such that the message includes only information necessary for activation of the controller 200. That is, the message received by the device 300 may include, for example, a text for user browsing, together with the information necessary for activation of the controller 200.

Therefore, the device 300 may edit the message such that only a message necessary for activation of the controller 200 remains among the contents of the received message by means of the first message processor 330. In this case, for example, the text for user browsing, removed from the message may be displayed on the device 300.

As another embodiment, the device 300 may forward the message transmitted by the push server 400 to the controller 200 without editing the message.

Next, the device 300 may transmit the message which is edited in the editing process or which is not edited without performing the editing process to the controller 200 (S407).

Upon receiving the message, the controller 200 may visually or audibly forward the contents of the message to the user or may control the AVNT system according to the contents of the message.

When the controller 200 directly receives the notification information at a periodic cycle by a polling scheme from the center server 100, if the controller 200 requests that the center server 100 transmit information, a connection time between the controller 200 and the center server 100 and a processing time for the request of the controller 200 by the center server 100 are consumed and such time consumption is repeated when the controller 200 requests that the center server 100 transmit information, i.e., every time polling is performed.

However, in an embodiment, if linkage setting (S100) of one time is ended, the center server 100 and the controller 200 consume a connection time between the push server 400 and the center server 100 and a processing time for the request only when the notification information occurs. In addition, when the same notification information is transmitted to a plurality of users, one connection processing is possible.

Accordingly, in an embodiment, a use time of the center server 100 is considerably reduced and use cost of the center server 100 due to reduction in use time of the center server 100 can be reduced.

In an embodiment, since the controller 200 does not directly receive the notification information from the center server 100 at a periodic cycle by a polling scheme and continuously receives the notification information by the polling scheme through a detour path via the push server 400, the controller 200 may rapidly receive the notification information in real time.

In an embodiment, since the center server provides the notification information to the controller through the push server operated by a third party and through a mobile device of the user, the user can reduce double burden of communication cost. A center server operator can easily solve occurrence of a communication obstacle and can reduce burden of expansion of the number of communication channels of the center server.

In an embodiment, since the controller continues to receive the notification information by a polling scheme through a detour path via the push server without directly receiving the notification information at a periodic cycle from the center server by the polling scheme, the controller can rapidly receive the notification information in real time.

Although only several embodiments have been described above, various other embodiments are possible. The technical contents of the above-described embodiments may be combined into various forms as long as they are not incompatible with another, and thus, may be implemented in new embodiments.

What is claimed is:

1. A method of providing a remote service, comprising steps of:
   performing, by a mobile device, linkage setting for setting a center server, a controller included in a vehicle, the mobile device, and a push server to transmit and receive information to and from each other;
   requesting, by the center server, the push server to transmit notification information using a push scheme;
   transmitting, by the push server, the notification information received from the center server to the mobile device using the push scheme; and
   forwarding, by the mobile device, the notification information received from the push server to the controller,
   wherein when the notification information is transmitted, the center server selects one of a first path or a second path for transmitting the notification information based on a property of the notification information,
   wherein the first path is a communication path for transmitting the notification information of the center server to the vehicle directly,
   wherein the second path is a communication path for transmitting the notification information of the center server to the vehicle via the push server and the mobile device, wherein when the first path is selected, the notification information of the center server is transmitted to the vehicle by a polling scheme, when the second path is selected, the notification information of the center server is transmitted to the vehicle by the push scheme, before selecting the first path or the second path, the center server and the vehicle are connected by the first path as a default and information of the center server is transmitted to the vehicle by the polling scheme, and wherein the controller periodically transmits and receives information to and from the center server using a polling scheme, and if the mobile device and the controller are coupled by short-range communication, the controller stops a periodic polling request performed with respect to the center server.

2. The method according to claim 1, wherein the step of performing the linkage setting comprises:

registering the mobile device in the push server; receiving, by the mobile device, a mobile device token issued by the push server;

registering, by the mobile device, mobile device information, the mobile device token, and account information about the center server in the center server;

performing coupling between the controller and the mobile device by short-range communication; and transmitting, by the controller, the mobile device information and vehicle information included in the controller to the center server.

3. The method according to claim 2, wherein the mobile device information includes a media access control (MAC) address of the mobile device, and the vehicle information includes a vehicle identification number (VIN) and a MAC address of the controller of the vehicle.

4. The method according to claim 3, wherein the step of performing the linkage setting further comprises:

registering, by the center server, the VIN, the account information, the MAC address of the controller, and the MAC address of the mobile device, when the MAC address of the mobile device received from the mobile device and the MAC address of received from the controller match.

5. The method according to claim 4, where the step of requesting the push server to transmit the notification information is performed when the controller of the vehicle is an activated state.

6. The method according to claim 4, wherein the step of requesting the push server to transmit the notification information comprises:

upon occurrence of the notification information which is to be transmitted to a specific vehicle from the center server, determining, by the center server, whether the MAC address of the mobile device linked with the controller of the vehicle is present in the center server;

determining, by the center server, whether the mobile device token corresponding to the MAC address of the mobile device is present; and transmitting, by the center server, the notification information by the center server to the push server and requesting the push server to transmit the notification information to the mobile device corresponding to the mobile device token.

7. The method according to claim 6, wherein the center server includes:

the VIN, the account information, information as to whether the controller is activated, the MAC address of the controller, and the MAC address of the mobile device; and the MAC address of the mobile device and the mobile device token corresponding to the MAC address of the mobile device.

8. The method according to claim 7, wherein the center server deletes the MAC address of the mobile device, when the mobile device token corresponding to the MAC address of the mobile device is not present.

9. The method according to claim 6, wherein the center server transmits the notification information to the push server in the form of a message.

10. The method according to claim 9, wherein the center server transmits the message to the push server by specifying whether the message is to be transmitted to the controller.

11. The method according to claim 9, wherein the step of transmitting the notification information comprises retransmitting the message received by the push server from the center server to the mobile device corresponding to the mobile device token included in the push server.

12. The method according to claim 11, wherein the push server informs the center server of failure of message transmission when the message is not transmitted to the mobile device.

13. The method according to claim 9, wherein the step of forwarding the notification information comprises:

if the message is transmitted by the push server to the mobile device, determining, by the mobile device, whether the message is to be forwarded to the controller; determining, by the mobile device, whether the mobile device and the controller are coupled by the short-range communication;

determining, by the mobile device, whether a MAC address of the controller recorded in the message is equal to the MAC address of the controller coupled by the short-range communication; and transmitting, by the mobile device, the message to the controller.

14. The method according to claim 13, further comprising a step of editing, by the mobile device, the message, when the MAC address of the controller recorded in the message is equal to the MAC address of the controller coupled by the short-range communication.

15. The method according to claim 14, wherein the mobile device edits the message such that the message includes information necessary only for activation of the controller.

16. The method according to claim 13, further comprising a step of changing the message to a command allowing the controller to transmit the mobile device information and the vehicle information included in the controller to the center server, when the MAC address of the controller recorded in the message is not equal to the MAC address of the controller coupled by the short-range communication.

17. The method according to claim 16, further comprising a step of changing the linkage setting between the center server, the controller, the mobile device, and the push server to correct inequality of the MAC addresses of the controller by performing, by the controller, the command, when contents of the message changed by the mobile device are transmitted to the controller.

18. The method according to claim 13, wherein the mobile device does not transmit the message to the controller, when the mobile device and the controller are not coupled by the short-range communication.

19. The method according to claim 13, wherein the mobile device is recoupled with the controller by the short-range communication when the mobile device and the controller are not coupled by the short-range communication.

20. A system for providing a remote service, comprising:
a center server;
a controller configured to transmit and receive a notification information to and from the center server and mounted in a vehicle;
a mobile device configured to transmit and receive the notification information to and from the center server and the controller; and
a push server configured to transmit and receive the notification information to and from the center server and the mobile device,
wherein the controller periodically transmits and receives the notification information to and from the center server using a polling scheme, and if the mobile device and the controller are coupled by a short-range communication, the controller stops a periodic polling request performed with respect to the center server,
wherein when the notification information is transmitted, the center server selects one of a first path or a second path for transmitting the notification information based on a property of the notification information,
wherein the first path is a communication path for transmitting the notification information of the center server to the vehicle directly,
wherein the second path is a communication path for transmitting the notification information of the center server to the vehicle via the push server and the mobile device,
wherein when the first path is selected, the notification information of the center server is transmuted to the vehicle by a polling scheme,
when the second path is selected, the notification information of the center server is transmitted to the vehicle by the push scheme, and
before selecting the first path or the second path the center server and the vehicle are connected by the first path as a default and information of the center server is transmitted to the vehicle by the polling scheme.

21. The system according to claim 20, wherein the mobile device is further configured to: communicate with the controller by the short-range communication;
communicate with the center server and the push server; and
process a message transmitted by the push server.

22. The system according to claim 20, wherein the controller is further configured to:
communicate with the mobile device by the short-range communication;
communicate with the center server; process a message transmitted by the center server or the mobile device; and
manage information transmission and reception of the controller and the center server using a polling scheme, wherein the controller includes:
a user application used by a passenger of a vehicle; and
a vehicle linkage interface connected to link the vehicle to the controller.

* * * * *